July 21, 1953 C. HAESLER 2,645,979
MILLING ATTACHMENT FOR UNIVERSAL MACHINE TOOLS
Filed Aug. 27, 1949 3 Sheets-Sheet 1

INVENTOR:
CHARLES HAESLER
BY Leon M. Straus

July 21, 1953 C. HAESLER 2,645,979
MILLING ATTACHMENT FOR UNIVERSAL MACHINE TOOLS
Filed Aug. 27, 1949 3 Sheets-Sheet 3

INVENTOR:
CHARLES HAESLER
BY Leon M. Straus

Patented July 21, 1953

2,645,979

UNITED STATES PATENT OFFICE 2,645,979

MILLING ATTACHMENT FOR UNIVERSAL MACHINE TOOLS

Charles Haesler, Le Locle, Switzerland, assignor to Haesler-Giauque & Cie, Fabrique de Machines, Le Locle, Switzerland Application August 27, 1949, Serial No. 112,746
In Switzerland September 15, 1948

4 Claims. (Cl. 90—15)

The present invention relates to a milling attachment for universal machine tools for the automatic machining of work clamped to a horizontal table, said table being pivotally mounted for rotation about a vertical axis and said work being machined by rotating tools fixed in spindles mounted rotatably and spatially around said rotary table in slides for adjustment as regards height, each spindle being rotatably mounted in a sleeve provided with a toothed rack on one side and said sleeve together with said spindle being carried for vertical adjustment on a guiding body, said guiding body in its turn being adapted for radial adjustment on a lower bracket fixed to the column of the machine, the three possibilities of adjustment of said spindles allowing each spindle together with its tool to be set according to the requirements of shape of the work to be machined and clamped on said rotary table of the machine and enabling a machining suitable for the shape required.

Other objects will be apparent from the description of an embodiment of the present invention which will now be described by way of example with reference to the accompanying drawing in order that the invention be better understood and readily carried into effect.

Figure 1:
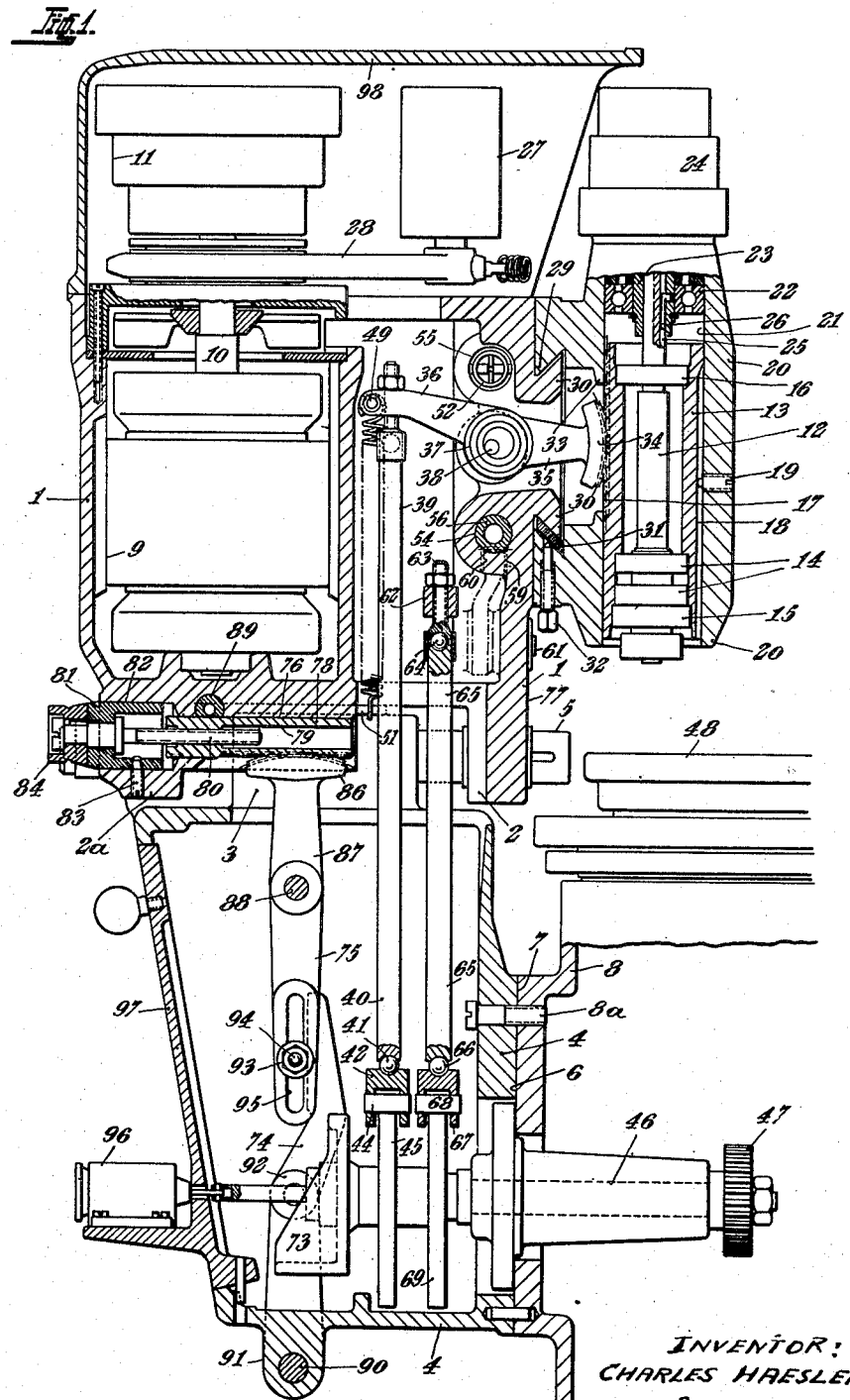
Fig. 1 is a vertical section through the milling attachment, the guiding body and the bracket of the machine viewed from the side.
Figure 2:
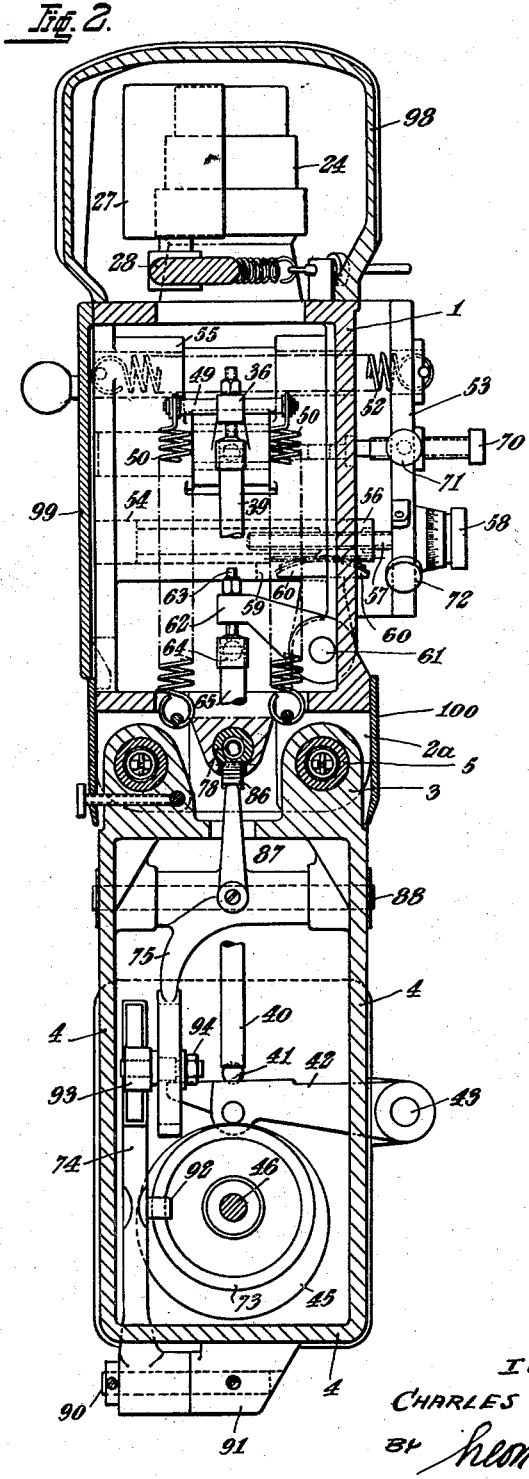
Fig. 2 is a vertical section and partial elevation of the milling attachment seen from the front.
Figure 3:
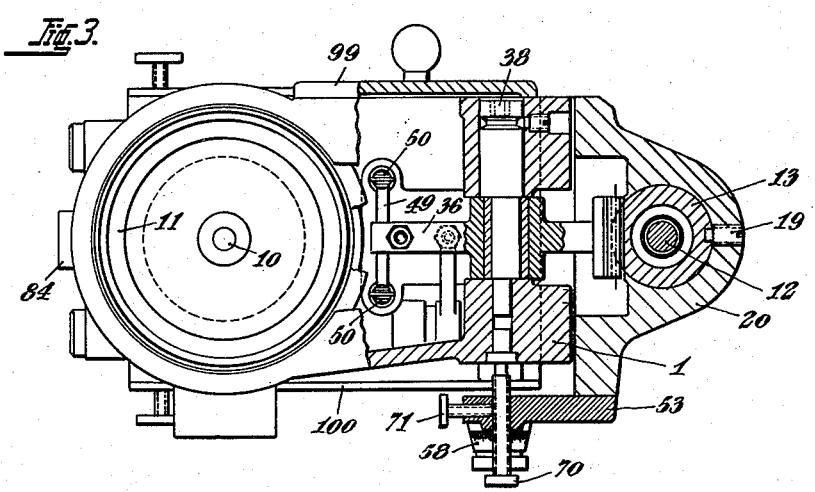
Fig. 3 is a plan view to Fig. 1 partly in section.

The attachment has an upper hollow guiding body 1 carrying at its lower end two front supports 2 and a common rear support 2a. Corresponding to said supports there are two supports 3 at the top of the bracket 4 which is secured to the column 8 of the machine. The guiding body 1 and the bracket 4 are joined to each other by means of two tubular-shaped cross-beams 5 held in the supports 2, 2a and 3 allowing the guiding body 1 to be displaced on the bracket 4. The bracket 4 has a fitting surface 6 by means of which said bracket bears against a similar fitting surface provided on the column 8 of the machine. In the guiding body 1 an electric motor 9 with a vertically disposed shaft 10 is arranged, said shaft carrying at its top end a driving pulley 11. Opposite the electric motor the spindle 12 is fitted to which the tool is secured. Said spindle is mounted in a sleeve 13 and is held by two ball bearings 14 in the lower end thereof, said ball bearings being inserted with initial tension in the sleeve 13 and secured by a nut 15. The top end of the spindle 12 is held by the ball bearing 16 fitting tightly in the sleeve 13. The sleeve 13 is provided on one side with a toothed rack 17 and on the opposite side with a groove 18 into which a screw 19 in the head 20 engages thus allowing a vertical displacement of the sleeve 13 in the bore 21. In the top part of the bore 21 two ball bearings 22 are arranged. These bearings carry the hollow shaft or hub 23 of the driving pulley 24 in the slide-head. The shaft of the spindle 12 is extended upwardly and is provided with a groove 25. It is guided for axial displacement in the bore of the hub 23 of the pulley 24 and is carried along by a key 26 fixed in the bore. The drive of the spindle 12 by the pulley 11 of the electric motor 9 takes place by a belt not shown in the drawing, said belt transmitting the rotations of the motor 9 to the pulley 24 and this in turn transmits it to the hollow shaft 23 and the spindle 12. A tension pulley 27 is secured to an arm 28 arranged for pivoting about the axis of the electric motor. Said tension pulley enables the tension of the belt to be adjusted.

The slide-head 20 is provided at its rear side with a slide guide-way 29, which is guided by two guiding ribs 30 secured to the guiding body 1. An adjustable gib 31 and an adjusting screw 32 in the spindle-head 20 permits play caused by wear and tear between the two parts to be taken up. At the rear of the slide-head 20 an opening 33 is provided between the ledges of the slide guide-way 29 through which the toothed segment 34 of the lever 35 projects in order to engage with the toothed rack 17 of the sleeve 13. The lever 35 is provided with a second arm 36 and a hub 37 and is pivotally mounted in the guiding body 1 by means of an eccentric guiding pin 38. A rod 39 is connected to the lever 36 by its upper end, whereas the lower end 40 of the rod 39 bears against a lever 42 by means of a ball 41, said lever 42 being connected to the bracket 4 by means of a pin 43. Said lever 42 is provided with a contact piece 44 by means of which the lever 42 bears against a cam disk 45. Said cam disk 45 is rigidly connected to the shaft 46 which carries a gear wheel 47 at its outer end, said gear wheel meshing with the gear of the rotary table 48 and thus ensuring the machining of the work to be machined in a position corresponding to the other tools and operations. At the end of the lever 36 a cross-rod 49 is secured, said cross-rod projecting on either side beyond said lever 36 and thereby enabling a coil spring 50 to be attached at either side of said lever. These coil springs are hooked to pins 51 in the guiding body at their lower ends and thus ensure a motion between the cam disk 45 and the lever 42 free of backlash. The guiding body 1 is provided with two parallel bores 54 and 55. In the bore 54 a cylindrical piece having a toothed rack 56 is fitted, said cylindrical piece being capable of being displaced and adjusted horizontally in said bore by means of a screw 57 which screw is pivotally mounted in the laterally projecting part 53 of the head 20. Said screw 57 has a knob 58 at one end provided with graduations which enable an accurate setting of the toothed rack 56 and a horizontal displacement of the slide-head 20 together with the spindle 12. Below the toothed rack an opening 59 is provided in the guiding body 1 through which opening a toothed segment 60 projects to engage the toothed rack 56. Said segment 60 can be pivoted about a pin 61. A lever 62 is connected with said segment 60, said lever bearing against a screw with a ball-socket 63 and a ball 64 at the top end of a rod 65, whereas the bottom end of the rod 65 rests on a ball 66 on the lever 67. The lever 67 pivots about the pin 43 and is provided with a contact piece 68 bearing against a small section of the circumference of a cam disk 69, said cam disk 69 being securely fixed to the shaft 46 and driven by the gear wheel 47 in a set relation to the rotation of the rotary table 48. In the upper bore 55 of the guiding body 1 a coil spring 52 is inserted, said coil spring being connected on one side to the projecting lateral part 53 of the slide-head 20 and on the other side to the guiding body 1. Under the drawing action of the coil spring 52 on the slide-head 20 the latter bears against the toothed segment 60 by means of the toothed rack and against the rod 65 by means of the lever 62 and through said lever 62 on the lever 67 and the cam disk 69. The slide-head 20 is therefore displaced horizontally owing to the rotation of the cam disk 69 and follows the motion thereof. An adjustable stop 70 limits the displacement of the slide-head 20 in the direction of the tension caused by the spring 52. Two screws 71 and 72 enable said stop screw 70 and said adjusting screw 58 of the toothed rack to be locked after adjustment.

A radial displacement of the guiding body 1 on the bracket 4 is caused by the cam disk 73 and the levers 74 and 75. For this purpose the guiding body 1 is guided on two hollow cross-beams 5 mounted on the bracket 4. In the hollow spaces of the cross-beams 5 coil springs are fitted bearing against the guiding body 1 in the opposite direction to the rotary table. In the bottom part of the guiding body 1 a horizontal bore 76 is provided at right angles to the vertical face 77 of the guiding body 1. Into said bore 76 a toothed rack 78 with the teeth on the bottom side and provided with a longitudinal bore 79 is fitted. Said toothed rack is horizontally displaceable by means of an adjusting screw 80 engaging in a screw thread in the bore 79. Said screw is held in a bush 81 provided in the bore 82 of the guiding body 1 by means of a screw 83. At the outer end of the screw 80 a head 84 provided with a graduation is fitted enabling the accurate setting of the guiding body by displacing the toothed rack 78 in the bore 76. The bore 76 has a slot at the bottom through which the toothed segment 86 of the lever 87 pivoted about the pin 88 engages with the toothed rack 78 and transmits the motion impressed upon it by the lever 75 to the guiding body 1. A locking piece 89 allows the toothed rack 78 to be secured in its adjusted position. The lever 75 is operated by the lever 74 which pivots about the pin 90 mounted in the bearing 91 of the bracket 4. The lever 74 is provided with a roller 92 bearing against a fraction of the circumference of the cam disk 73. The top end of the lever 74 is straight and transmits the motion imparted said lever by the cam disk 73 on a magnified scale to the roller 93 and thus to the lever 75, said roller being mounted on a pin 94 which pin is secured in the slot 95 of the lever 75. The pin 94 together with the roller 93 can be adjusted in the slot 95 and thus the motion of the lever 75 and the toothed segment 86 be altered and regulated. The cam disk 73 is secured to the shaft 46 which is driven by an intermediate gearing from the rotary table. A counter 96 is in operative connection with the shaft 46 and enables the output of the machine to be checked. The bracket 4 is hollow and open at one side to make the cam disks 69, 45 and 73 accessible. This opening can be closed by a lid 97.

A protective cover 98 is provided on the guiding body 1 for covering the driving pulley 11 and the driving belt of the pulley of the spindle. The guiding body 1 is open at one side to facilitate assembly and checking of the operation of the individual parts and can be closed off by means of a removable lid 99. On either side of the tubular-shaped cross-beam 5 the cover plates 100 are provided to prevent ingress of dirt.

The milling attachment is in most cases used for machining with the spindles disposed vertically. There is, however, nothing to prevent the use of the same attachment for machining with the spindles disposed horizontally on the machine.

What I claim and wish to secure by Letters Patent is:

1. A machine tool comprising a head provided with a vertical bore, a sleeve vertically displaceable in said bore, a tool spindle rotatably held in said sleeve, said sleeve being externally provided with a toothed portion, a support for said head provided with guide means enabling lateral movement of said head relative to said support, a first lever pivoted to said support, said lever having a first arm carrying a toothed sector engaging said toothed portion, said lever further having a second arm, said head being provided with an extension, a toothed rack secured to said extension, a second lever pivoted to said support and provided with a toothed extremity engaging said toothed rack, a standard provided with rail means, said support being slidably carried on said rail means, an additional toothed rack on said support, a third lever pivoted to said standard and provided with a toothed extremity engaging said additional toothed rack, a first rod operatively connected with said second arm of said first lever, a second rod operatively connected to said second lever, a shaft, drive means for deriving rotation of said shaft, means including said first rod and a first cam disk on said shaft for imparting movement to said first lever, means including said second rod and a second cam disk on said shaft for imparting movement to said second lever, and means including a third cam disk on said shaft for imparting movement to said third lever.

2. A machine tool according to claim 1, wherein said support is provided with a pin having an eccentric portion, said first lever being pivoted on said eccentric portion, said extension being provided with a first adjustment screw engaging the first mentioned toothed rack, thereby enabling control of the lateral position of said head relative to said support, said support being provided with a second adjustment screw engaging said additional toothed rack, thereby enabling control of the radial position of said support on said standard.

3. A tool holder for milling machines comprising a rotatable spindle, a base, supporting means for said spindle mounted on said base and provided with a plurality of guide means enabling displacement of said spindle relative to said base in predetermined directions, a cam shaft, a plurality of control mechanisms for translating rotation of said cam shaft into movement of said spindle in a respective one of said directions, each of said control mechanisms comprising a cam on said cam shaft, cam follower means for engaging a respective cam, a lever operatively coupled with said cam follower means and provided with a toothed extremity, a rack engaged by said toothed extremity, and adjustable control means comprising pivot means for said lever including a pin provided with an eccentric portion, said lever being swingable about said eccentric portion, said adjustable control means being included in at least one of said mechanisms for modifying the operation thereof independently of each of the remaining ones of said mechanisms.

4. A tool holder for milling machines comprising a rotatable spindle, a base, supporting means for said spindle mounted on said base and provided with a plurality of guide means enabling displacement of said spindle relative to said base in predetermined directions, a cam shaft, a plurality of control mechanisms for translating rotation of said cam shaft into movement of said spindle in a respective one of said directions, each of said control mechanisms comprising a cam on said cam shaft, cam follower means for engaging a respective cam and comprising a first lever, a second lever operatively coupled with said first lever and provided with a toothed extremity, a rack engaged by said toothed extremity, and adjustable control means comprising an abutment adjustably carried by an extremity of one of said levers and making contact with an extremity of the other of said levers, said adjustable control means being included in at least one of said mechanisms for modifying the operation thereof independently of each of the remaining ones of said mechanisms.

CHARLES HAESLER.

References Cited in the file of this patent
UNITED STATES PATENTS

| Number | Name | Date |
|---|---|---|
| 576,979 | Gregory | Feb. 9, 1897 |
| 1,061,973 | Bilton | May 20, 1913 |
| 1,285,820 | Smith et al. | Nov. 26, 1918 |
| 1,860,840 | Marsilius et al. | May 31, 1932 |
| 1,879,548 | Sethman | Sept. 27, 1932 |
| 2,353,480 | Marsilius | July 11, 1944 |
| 2,375,789 | Hungerford | May 15, 1945 |